Aug. 27, 1963   F. O. MOODY ETAL   3,101,922
SNAP FASTENER
Filed March 7, 1962   3 Sheets-Sheet 1
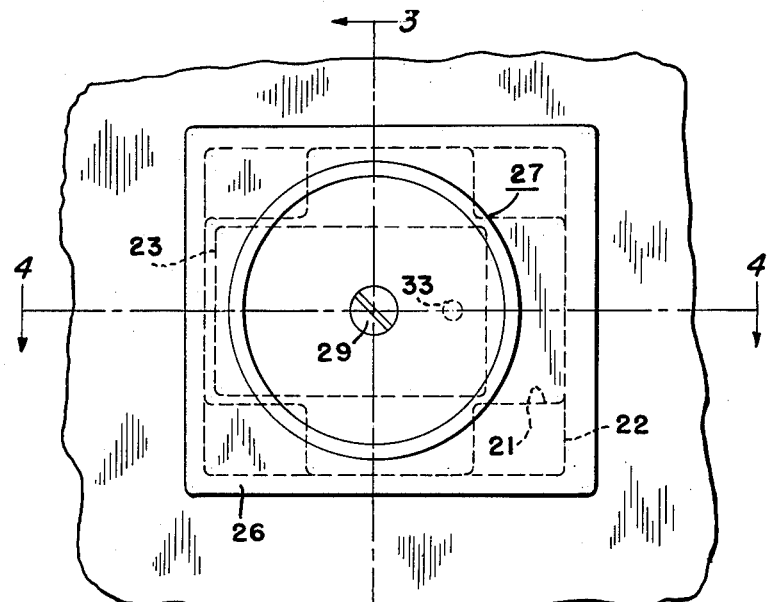
Fig. 2
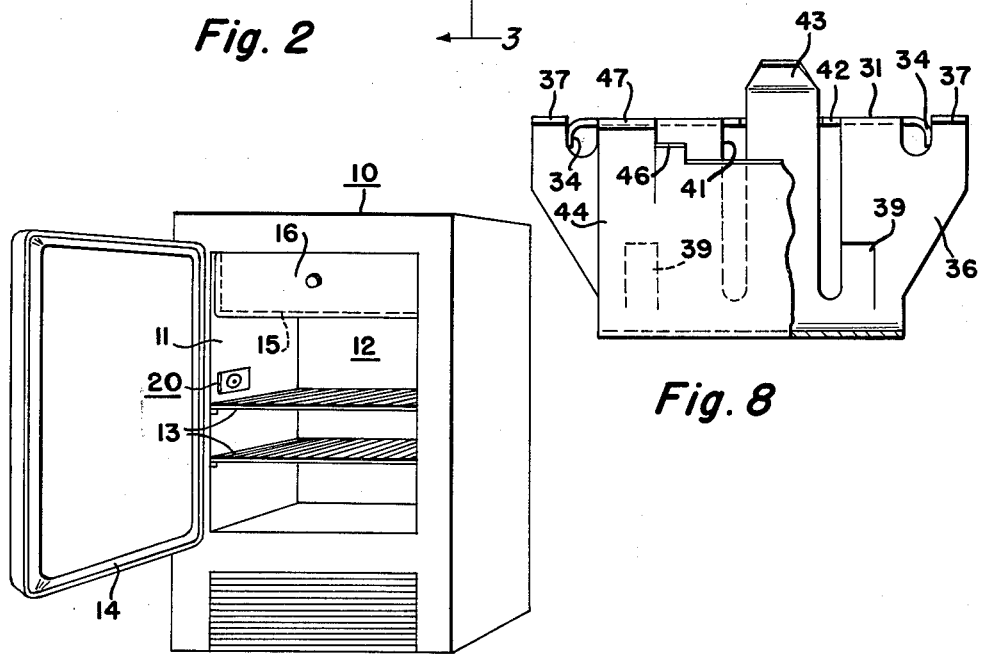
Fig. 8
Fig. 1
INVENTORS.
Floyd O. Moody
BY Charles W. Eyman, Jr.
Lloyd M. Keighley.
Their Attorney INVENTORS.
Floyd O. Moody
BY Charles W. Eyman, Jr.
Lloyd M. Keighley
Their Attorney INVENTORS
Floyd O. Moody
BY Charles W. Eyman, Jr.

Lloyd M. Keighley
Their Attorney

3,101,922
SNAP FASTENER
Floyd O. Moody and Charles W. Eyman, Jr., Dayton, Ohio, assignors to General Motors Corporation, Detroit, Mich., a corporation of Delaware
Filed Mar. 7, 1962, Ser. No. 178,015
10 Claims. (Cl. 248—27)

This invention relates to a one-piece fastener for mounting an electrical device and a cover plate therefor separate from the device on a wall or support in alignment with an aperture therein.

An object of our invention is to provide a simple, improved and inexpensive fastener element in the form of a metal spring clip or bracket for holding an electrical device or instrument and a cover plate in assembled relationship on a wall or support at an aperture therein by various parts of the element being sprung into interlocking engagement with the electrical device, edges of the aperture and portions of the plate.

Another object of our invention is to provide a one-piece spring fastener element with a plurality of attaching portions formed integral thereon having an inherent or normal biasing action, the action of which is increased in certain directions as a device to be carried thereby is assembled therewith and as the element is sprung and interlocked to edges of an aperture in a wall or support utilized for mounting the device thereon.

Another object of our invention is to provide in combination with a wall or support having an aperture therein, a one-piece spring element for mounting an electrical device and a cover plate therefor in assembled relationship on opposite sides of the wall or support at the aperture for ready removal of the plate from the device so as to render the element accessible for detaching same and the electrical device carried thereby from the wall for repair or replacement.

A further object of our invention is to provide a single means for detachably mounting both an electrical instrument or switch device, having a member or adjustable actuator projecting therefrom, and an escutcheon cover plate therefor, having an opening receiving the member or actuator, in assembled relationship with one another on a wall support at an aperture therein from one side or face of the wall support with a part of a movable indicator or knob extending through the opening in the plate and secured to the switch actuator for operating same at the one face of the wall support.

Still further objects and advantages and other new, novel and useful features in the construction of the snap fastener, arrangement and general combinations of elements and parts of the invention should become apparent as the following description proceeds.

In the drawings:

FIGURE 1 is a front perspective view of a refrigerator cabinet with the food chamber door opened to show an adjustable cold control instrument mounted on an inner wall of the chamber by a fastener constructed in accordance with our invention;

FIGURE 2 is an enlarged fragmentary plan view of the chamber wall showing the instrument mounted thereon in alignment with a cross-shaped aperture therein;

FIGURE 8 is another side view of the spring clip shown in FIGURES 6 and 7 with a portion thereof broken away.

Figure 5:
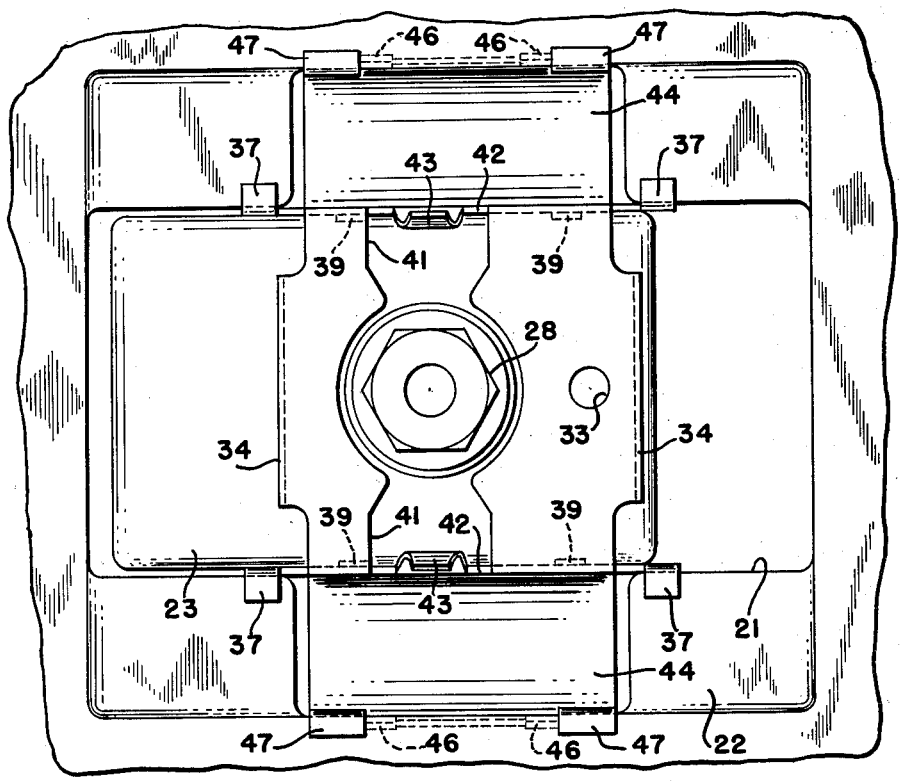
FIGURE 5 is a view similar to FIGURE 2 with the operating knob and cover plate of the cold control instrument removed from the food chamber wall showing the spring clip of our invention holding the electrical switch device of the instrument in the aperture of the wall.
Figure 3:
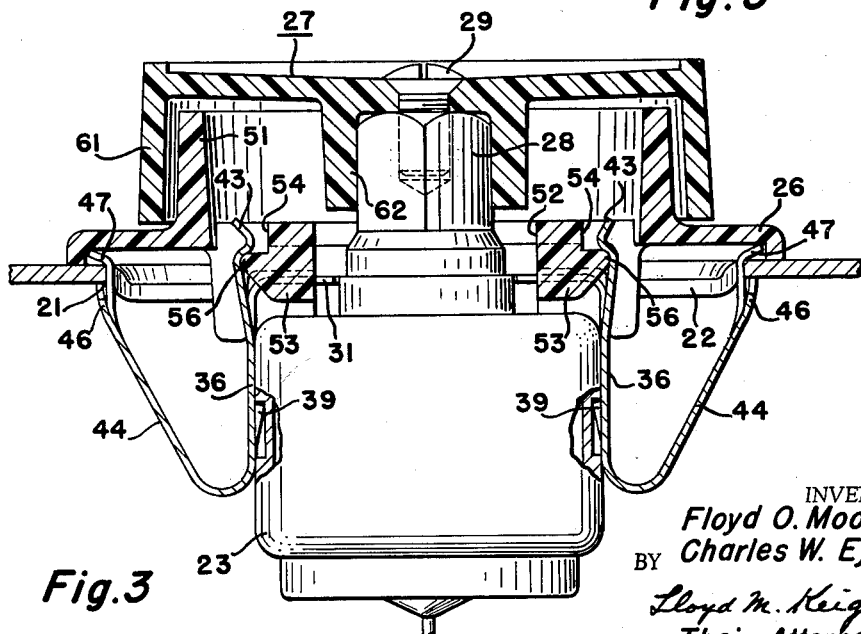
FIGURE 3 is a fragmentary horizontal sectional view taken along the line 3—3 of FIGURE 2 showing parts of the cold control instrument assembled together and mounted on opposite sides of the food chamber wall.
Figure 4:
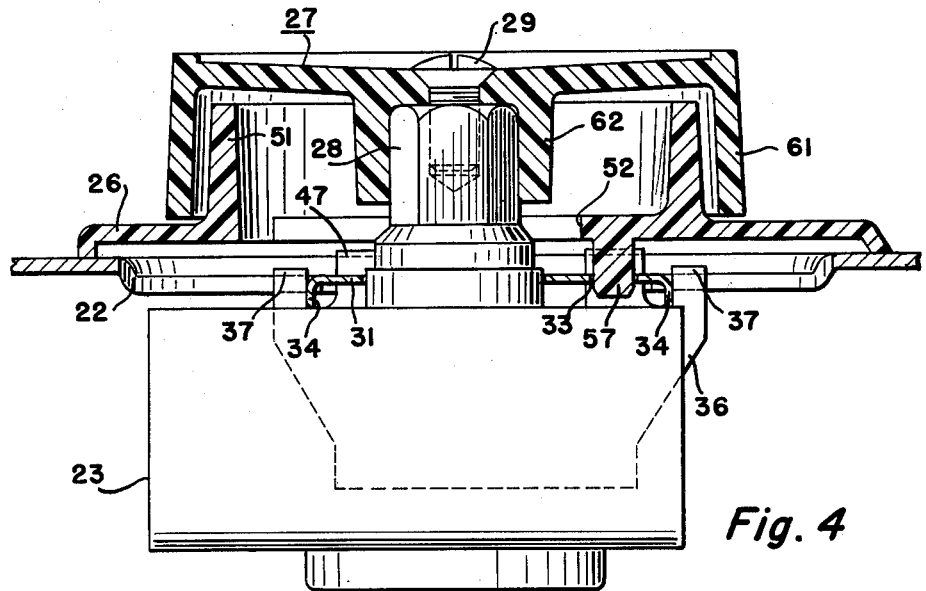
FIGURE 4 is a fragmentary vertical sectional view taken along the line 4—4 of FIGURE 2 showing the relationship of parts of the assembled instrument.

Referring to the drawings, we show in FIGURE 1 thereof, for illustrating the present invention, a household refrigerator cabinet 10 comprising a plurality of insulated walls including a metal liner 11 defining a food storage chamber 12 within the cabinet having spaced-apart shelves 13 disposed therein. Chamber 12 is provided with an access opening normally closed by an insulated door structure 14 and a refrigerating system (not shown) associated with cabinet 10 including a refrigerant evaporator, indicated by the dotted lines 15, mounted in the chamber, behind a movable cover or door 16, for cooling and preserving foods stored therein. Such a refrigerator is conventional and well known to those skilled in the art and is shown merely to illustrate one or a preferred application of our invention. Refrigerator cabinet 10 is provided with a cold control instrument generally represented at 20 in FIGURE 1 associated with an aperture 21 (see FIGURES 2 and 5) provided in the wall or liner 11 of chamber 12 which forms a support for the instrument. Aperture 21 is substantially cross shaped and includes two intersecting or crossing portions within a squared depression or recess, indicated at 22, provided in liner 11 of chamber 12. Such an instrument or control is conventional and ordinarily comprises an electrical device or an adjustable thermostatically actuated electric switch located in a casing indicated by the reference numeral 23 in the drawings. The electrical switch device of instrument 20 within casing 23 is actuated by a thermal sensing unit having one end of a tube part thereof contacting the evaporator 15. The unit senses temperatures of evaporator 15 for rendering the switch responsive thereto for starting and stopping operation of a motor-compressor unit of the refrigerating system. The switch within casing 23 may be manually adjusted to cause the refrigerating system to change the temperature of evaporator 15 and consequently temperature limits maintained within the refrigerated chamber 12. These thermally actuated electric control switches are now well known and the mechanism within casing 23 may, for example, be constructed in accordance with the structure shown and more fully described in the patent to F. O. Moody et al. #2,906,132 dated September 29, 1959. Instrument 20 shown in FIGURE 1 comprises two parts to be mounted in assembled relationship with one another on the wall or support, liner 11, by a single spring clip, bracket or one-piece element constructed according to our invention. These parts are the electrical switch device within casing 23 and an escutcheon cover plate 26 (see FIGURES 3 and 4) which are yieldably supported on the wall support or liner 11. A wheel or knob 27 is secured over a portion of plate 26 of the assembly to a hexagonal movable member 28 of the device within casing 23 which projects therefrom, through an opening in the plate, by a screw 29, with the wheel or knob exposed to the interior of chamber 12 for rotation therein to adjust the switch mechanism in casing 23. The parts, casing 23 and cover plate 26 of instrument 20, are both supported on wall or support 11 in association with the cross-shaped aperture 21 therein by a one-piece spring element, preferably a clip or bracket, the construction of which will now be described so that corelation of various portions thereof with parts of the instrument assembly can be better understood when the mounting of device or casing 23 thereon and attachment of the spring element to the support for receiving the cover plate is explained.

Figure 7:
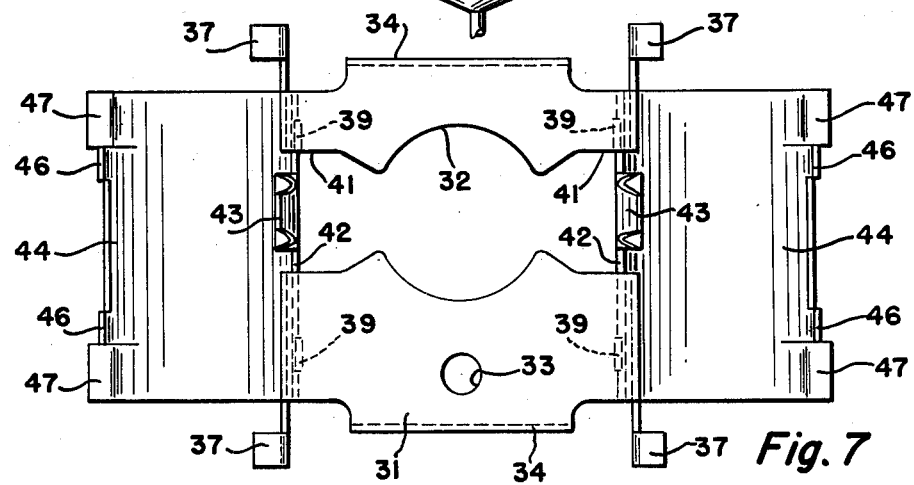
FIGURE 7 is a plan view of the spring clip shown in FIGURE 6.
Figure 6:
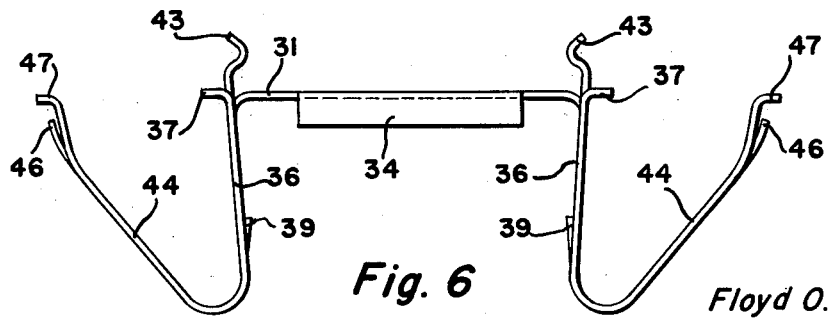
FIGURE 6 is a side view of a one-piece spring clip fabricated in accordance with our invention.

Referring now to FIGURES 6, 7 and 8 of the drawings, we show therein the one-piece spring fastener bracket constructed in accordance with our invention and to be associated or combined with the elements already described. The mounting fastener, bracket or element is preferably, although not necessarily, formed of stainless sheet steel material and comprises a base 31 (see FIGURE 6) having a substantially central opening 32 and an off-center hole 33 therein (see FIGURE 7). Base 31 has spacer flanges 34 bent from two sides thereof and legs 36 bent from the other two sides thereof, in the direction of the base to form a pocket or casing receiving portion intermediate the legs 36 which provide opposed sides or walls of the pocket. There are tabs 37 bent outwardly from sides 36 of the pocket and substantially aligned with base 31. Tabs 37 provide short stop ears one at each corner of base 31 of the pocket of the spring clip or bracket. The legs or sides 36 are each lanced or cut to provide two spaced-apart barbs 39 thereon struck therefrom and directed inwardly of the pocket. Parts of base 31 adjacent the pocket sides or legs 36 and parts of these legs themselves are cut out, as at 41 and 42 respectively (see FIGURES 7 and 8), and the material of the cutouts is bent to extend from the pocket beyond the base thereof to provide opposed fingers 43 formed integral on the legs, each projecting perpendicularly to base 31, and having a hook-like end thereon. A portion of the spring element adjacent the free end of opposite sides or of each leg 36 of the pocket is reversely bent laterally therefrom in the direction of pocket base 31 to provide wings or arms 44 (see FIGURE 6) formed integral on the legs. The outer end of arms 44 is cut away intermediate edges thereof to provide barbs 46 thereon with edges of the arms at their outer ends formed into a hook 47 extending beyond or spaced from the barbs 46. The hook end portions 47 of arms 44 are spaced outwardly from legs 36 and hooked fingers 43 and are normally in substantial alignment with the ears 37 and base 31. FIGURES 6, 7 and 8 of the drawings depict the one-piece spring element as originally fabricated and it will be noted that the pocket sides or legs 36 are bent away from base 31 at an acute angle with respect to a right angle relative thereto so that the free ends of these pocket sides are spaced apart a lesser distance than the ends thereof adjacent the base of the pocket. This is an improvement in our one-piece spring element, the feature of which will be described hereinafter. Plate 26 employed to cover and conceal the cross-shaped aperture 21 in the wall or support, liner 11, is provided with a round flange 51 projected outwardly from its face and an opening 52 inwardly of this flange has a part thereof extending entirely through the plate. Opposed spaced-apart bosses 53 projected from the side of plate 26, opposite flange 51, are each provided with an opening 54 therein shouldered as at 56. A round positioning boss 57, relatively shorter than the bosses 53, is formed on this side of plate 26 and projects therefrom in the direction of projections or bosses 53. Boss 57 is adapted to be received in hole 33 provided in base 31 of the one-piece spring element as and for a purpose to be hereinafter described.

In assembling parts of the instrument 20 on liner 11 casing 23, containing the electrical device, is first wedged between legs 36 of the spring mounting fastener or element and is then forced into the pocket thereof to rest against the spacer flanges 34. The four barbs 39 on legs 36 snap into openings provided in casing 23 to thereby lock the casing and its contained electrical device within the pocket of the spring element against movement relative thereto. This wedging of casing 23 into the pocket spreads the legs 36 apart and the spreading thereof increases the spring biasing action of arms 44 in a direction away from one another and of fingers 43 in a direction toward one another by virtue of their being formed integral on the legs. The increased biasing action applied to these clamping or attaching portions of the spring element in this fashion is advantageous and very useful in tightly interlocking the arms 44 to opposed edges of aperture 21 in support or liner 11 and in tightly interlocking the fingers 43 to the shoulders 56 on plate 26. With attaching portions of the spring element so biased and carrying casing 23 in the pocket thereof arms 44 of this element are pushed into aperture 21, from one side or face of the wall or support, liner 11, to compress the arms 44 toward one another. The barbs 46 pass opposed edges of the aperture and snap against the other side or face of the wall support 11, adjacent aperture 21, and the hooked ends 47 of arms 44 engage the one side thereof whereby that portion of the arms intermediate barbs 46 and ends 47 of the spring element are interlocked to edges of the aperture. Spacing of the ends 47 from barbs 46 on each arm 44 mounts the one-piece spring element and consequently the electrical device within casing 23 to the support or wall 11 against rotation and sliding movement relative thereto with the cut-out portion of the element between barbs 46 spaced from edges of aperture 21 to facilitate removal of the spring element and casing 23 carried thereby to a unit in a manner to be presently described.

The plate 26 is centered over aperture 21, in parallel relationship to wall 11, with positioning boss 57 thereon registering or aligning with hole 33 in base 31 of the spring fastener element. Plate 26 is then pushed in a direction toward the inner side or one face of support 11 whereby the hooked end or fingers 43 enter the openings 54 to spring the fingers outwardly of one another and to cause them to snap over into interlocking engagement with shoulders 56 on the plate to draw or clamp same tightly into engagement with wall or support 11. Bosses 53 at the inner side of plate 26 straddle base 31 of the spring mounting element and extend along sides 36 of the pocket thereof to guide positioning boss 57 into the hole 33 in base 31 to lock the plate over aperture 21 in the wall support. Thus, the spring bracket or element herein disclosed serves as a single means to mount both the electrical switch device in casing 23 and plate 26 in assembled relationship with one another upon opposite sides or faces of wall 11 without the aid of additional elements to cover and conceal the cross-shaped aperture therein with the hexagonal movable member 28 of the switch in casing 23 projecting into opening 52 of the cover plate. Adjusting knob 27 is provided with a circular flanged portion 61 which is adapted to encircle flange 51 on escutcheon plate 26 and a hexagonal cavity in a central hub portion 62 thereof receives movable member 28 of the device within casing 23. The knob or wheel 27 is centered over flange 51 on plate 26 and pushed toward the plate with its flanged portion 61 surrounding flange 51 and with the hexagonal cavity in hub portion 62 fitted over the hexagonal movable or rotatable member 28 of the electric switch device in casing 23. Screw 29 is then passed through a hole provided in the hub portion 62 of hub 27 and threaded into a suitably tapped hole in member 28 to secure the adjustable knob or wheel to the assembly. Rotatable knob 27 may be provided with certain indicia spaced about its circumference to register with stationary indicia on plate 26 so as to determine variations in the setting or adjustment of the electric switch within casing 23 for controlling temperatures of evaporator 15 produced by the refrigerating system. There may also be provided on plate 26 and on knob 27 respectively conventional cooperating stop means to prevent continued rotation of the adjusting knob and member 28 in one or the same direction.

While all components of the instrument assembly 20 are firmly mounted in interlocked relationship with one another on liner 11 of the food chamber 12 in cabinet 10 these component parts can be readily disassembled for repair or replacement. For example, should the knob 27 be damaged, it may be removed by withdrawing screw 29 from member 28 to permit removal of same from plate 26. If escutcheon plate 26 is damaged, it can be detached from the assembly and support 11, while knob 27 is removed, by inserting a screw driver into the openings 54 therein and prying the fingers 43 loose from shoulders 56 on the plate. If the electrical device or switch within casing 23 need be repaired or replaced, the spring fastener clip carrying same is detachable from support 11 interiorly of food chamber 12. To accomplish this latter detaching operation, a screw driver or the like is, while plate 26 is removed, inserted into the cut-away portion of each arm 44 of the spring element or bracket, between the barbs 46 therein, and pried against the edge of aperture 21 to move barbs 46 inwardly of opposed edges of the aperture to clear the wall or support 11. Both the spring mounting element and the switch casing 23 carried thereby are then withdrawn through the aperture 21 in support 11. These detaching or removing operations can be performed without the use of a multiplicity of special tools and without damaging parts of instrument 20 or the spring mounting element therefor to thereby permit reuse thereof. We show the one-piece spring element of our invention in combination with an aperture of a wall of a refrigerator cabinet and an adjustable electric switch, but we do not wish to be restricted to this specific arrangement since the mounting element is capable of holding any electrical or the like device and an escutcheon plate at an aperture in a support with the plate closing and concealing the aperture.

From the foregoing it should be apparent that we have provided a single means or one-piece spring element for rigidly mounting both an electrical device and an escutcheon cover plate in assembled relationship on a wall or support in association with an aperture therein with the plate removable from the assembly without detaching the mounting element and the device carried thereby from the support. The fastening or mounting element is of low cost to produce and yet is highly effective and reliable for the purpose described. While the assembly is securely fastened together on a support with other parts attached thereto all components of an instrumentality of the character herein disclosed are readily detachable from one another and from the support. The present arrangement not only facilitates assembly of the instrument onto a refrigerator cabinet along a production line, but also eases disassembly thereof by a service man with a minimum of tools and with few parts to be accounted for.

While the embodiment of the present invention as herein disclosed constitutes a preferred form, it is to be understood that other forms might be adopted.

What is claimed is as follows:

1. In combination:
   (a) a support provided with an aperture therein,
   (b) an electrical device and a plate separate therefrom adapted to be supported on said support,
   (c) a single means for mounting both said device and said plate in assembled relationship on said wall with the plate paralleling same and covering the aperture in the wall,
   (d) said single means comprising a spring clip having a base and opposed walls forming a substantially U-shaped pocket, arms formed integral with ends of the legs of said opposed walls bent in the direction of the base of said pocket and a finger formed integral with each opposed pocket wall extending outwardly of said base beyond said pocket,
   (e) said opposed pocket walls, said arms and said fingers having a normal biasing action,
   (f) said electrical device being wedged between the opposed walls of said clip and clamped thereby within said pocket,
   (g) the wedging of said device into said pocket shifting opposed walls thereof away from one another to increase the biasing action of said arms in opposite directions and to increase the biasing action of said fingers in a direction toward each other,
   (h) said arms being sprung into the aperture in said support with their ends interlocked to opposed edges of the aperture for securing said device to the support, and
   (i) opposed portions on said plate spreading said fingers apart as the plate is brought into engagement therewith for snapping the fingers thereover to secure said plate against said support.

2. In combination:
   (a) a support provided with an aperture therein,
   (b) an electrical device and a plate separate therefrom adapted to be supported on said support,
   (c) a single means for mounting both said device and said plate in assembled relationship on said wall with the plate paralleling same and covering the aperture in the wall,
   (d) said single means comprising a spring clip having a base and opposed walls forming a substantially U-shaped pocket, barbs struck from said opposed walls and projecting into the pocket, arms formed integral on ends of the legs of said opposed walls bent in the direction of the base of said pocket and a finger formed integral on each opposed pocket wall extending outwardly of said base beyond said pocket,
   (e) said electrical device being disposed between the opposed pocket walls and locked in said pocket by said barbs fitting into openings provided in the device,
   (f) the free ends of said arms being sprung into the aperture in said support and interlocked to opposed edges of the aperture for securing said device to the support,
   (g) opposed portions provided on said plate spreading said fingers apart as the plate is brought into engagement therewith for snapping the fingers thereover to secure said plate against said support, and
   (h) said fingers being accessible through said plate for release from said portions thereof whereby the plate is removable from said support while said spring clip retains said electrical device supported on the support.

3. In combination:
   (a) a support provided with an aperture therein,
   (b) an electrical device adapted to be supported on one side of said support and a plate separate from said device adapted to be supported on the other side of said support,
   (c) a single means for mounting said device and said plate in assembled relationship on opposite sides of said support with the plate paralleling same and covering the aperture in the support,
   (d) said single means comprising a spring clip having a base and opposed walls forming a substantially U-shaped pocket, arms formed integral with ends of the legs of said opposed walls bent in the direction of the base of said pocket and a finger formed integral with each opposed pocket wall extending outwardly of said base beyond said pocket,
   (e) said opposed pocket walls, said arms and said fingers having a normal biasing action,
   (f) said electrical device being wedged between the opposed walls of said clip and clamped thereby within said pocket,
   (g) the wedging of said device into said pocket shifting opposed walls thereof away from one another to increase the biasing action of said arms in opposite directions and to increase the biasing action of said fingers in a direction toward each other,
   (h) said arms being sprung into the aperture in the support with their ends interlocked to opposed edges of said aperture for securing said device to said support on said one side thereof, and (i) opposed portions on said plate spreading said fingers apart as the plate is brought into engagement therewith for snapping the fingers thereover to secure said plate against said other side of said support.

4. In combination:
(a) a support provided with an aperture therein,
(b) an electrical device adapted to be supported on one side of said support and a plate separate from said device adapted to be supported on the other side of said support,
(c) a single means for mounting said device and said plate in assembled relationship on opposite sides of said support with the plate paralleling same and covering the aperture in the support,
(d) said single means comprising a spring clip having a base and opposed walls forming a substantially U-shaped pocket, barbs struck from said opposed walls and projecting into the pocket, arms formed integral on ends of the legs of said opposed walls bent in the direction of the base of said pocket and a finger formed integral on each opposed pocket wall extending outwardly of said base beyond said pocket,
(e) said electrical device being disposed between the opposed pocket walls and locked in said pocket by said barbs fitting into openings provided in the device,
(f) the free ends of said arms being sprung into the aperture in said support and interlocked to opposed edges of the aperture for securing said device to the support on said one side thereof,
(g) opposed portions provided on said plate spreading said fingers apart as the plate is brought into engagement therewith for snapping the fingers thereover to secure said plate against said other side of said support, and
(h) said fingers being accessible through said plate at said other side of said support for release from said plate portions whereby the plate is removable from the support while said spring clip retains said electrical device supported on said one side of said support.

5. In combination:
(a) a support provided with an aperture therein,
(b) an electrical device adapted to be supported on one side of said support and a plate separate from said device adapted to be supported on the other side of said support,
(c) a single means for mounting said device and said plate in assembled relationship on opposite sides of said support with the plate paralleling same and covering the aperture in the support,
(d) said single means comprising a spring clip having a base and opposed walls forming a substantially U-shaped pocket, arms formed integral with ends of the legs of said opposed walls bent in the direction of the base of said pocket, a finger formed integral with each opposed pocket wall extending from the bottom of said base and stop ears formed integral with the opposed walls of said pocket at corners thereof bent outwardly therefrom substantially aligned with the base,
(e) said opposed pocket walls, said arms and said fingers having a normal biasing action,
(f) said electrical device being wedged between the opposed walls of said clip and clamped thereby within said pocket,
(g) the wedging of said device into said pocket shifting opposed walls thereof away from one another to increase the biasing action of said arms in opposite directions relative to one another and to increase the biasing action of said fingers in a direction toward each other,
(h) said spring clip being insertable into the aperture in the support with said stop ears abutting said support adjacent certain opposed edges of said aperture therein and with ends of said arms on the clip sprung into interlocked contact with certain other opposed edges of said aperture for securing said device to said support on said one side thereof, and
(i) opposed portions on said plate spreading said fingers apart as the plate is brought into engagement therewith for snapping the fingers thereover to secure said plate against said other side of said support.

6. In combination:
(a) a support provided with an aperture therein,
(b) an electrical device adapted to be supported on one side of said support and having a projecting member extended into the aperture in the support,
(c) a plate separate from said device adapted to be supported on the other side of said support and having an opening therein for receiving the projecting member on the electrical device,
(d) a single means for mounting said device and said plate in assembled relationship on opposite sides of said support with the plate paralleling same and covering the aperture in the support,
(e) said single means comprising a bracket having a base and opposed walls forming a substantially U-shaped pocket, arms formed integral with ends of the legs of said opposed walls bent in the direction of the base of said pocket and a finger formed integral with each opposed pocket wall extending outwardly of said base beyond said pocket,
(f) said opposed pocket walls, said arms and said fingers of the bracket having a normal spring biasing action,
(g) said electrical device being wedged between the opposed walls of said bracket and locked thereby within said pocket,
(h) the wedging of said device into said pocket shifting opposed walls thereof away from one another to increase the biasing action of said arms in opposite directions relative to one another and to increase the biasing action of said fingers in a direction toward each other,
(i) said arms being sprung into the aperture in the support with their ends interlocked to opposed edges of said aperture for securing said device to said support on said one side thereof, and
(j) opposed portions on said plate spreading said fingers apart as the plate is brought into engagement therewith for snapping the fingers thereover to secure said plate against said other side of said support with said projecting member on said device disposed within the opening in the plate.

7. In combination:
(a) a support having a cross-shaped aperture therein,
(b) a single means for mounting an electrical device and a cover plate separate therefrom upon opposite faces respectively of said support comprising,
(c) a spring clip provided with walls forming a base and sides of a pocket, an arm on each of two sides of said pocket reversely bent with respect thereto in the direction of said base, stop ears on the sides of said pocket extending laterally from said base thereof substantially in alignment therewith and spaced-apart fingers on the sides of said pocket projecting perpendicularly to its base intermediate said arms,
(d) said electrical device being locked in the pocket of said device against detachment therefrom,
(e) said clip being sprung into the cross-shaped aperture in said support from one face thereof with said stop ears abutting corners of said face at the intersection of crossing portions of said aperture to position said electrical device beyond the other face of said support aligned with one of said crossing portions of the aperture and to interlock ends of said arms on the clip to opposed edges of the other crossing portion of said aperture with said fingers exposed through the aperture to the opposite face of said support, (f) parts of said cover plate being received by said exposed fingers whereby to clamp the plate against said one face of said support for concealing the cross-shaped aperture therein, and (g) the clamping of said plate to fingers on said clip holding the plate and said device in assembled-together relationship upon said support.

8. The combination defined by claim 7 wherein the fingers on the clip are springably detachable at the one face of the support from the plate for removing same from said clip while the electrical device remains locked thereto upon said support.

9. The combination defined by claim 7 wherein the fingers on the clip are springably detachable at the one face of the support from the plate for removing same from said clip and wherein ends of the arms thereof are accessible and unlockable from edges of the aperture in said support after removal of said plate for withdrawal of the clip and said device locked thereon through said aperture.

10. In combination:
   (a) a wall provided with an aperture therein,
   (b) an electrical device and a cover plate therefor separate therefrom adapted to be supported on said wall,
   (c) a single means mounting both said device and said cover plate in assembled together relationship upon said wall with the electrical device disposed adjacent the aperture therein on one side of the wall and the cover plate parallelly abutting the opposite side of said wall and overlapping said aperture,
   (d) said single means comprising a sheet metal spring bracket provided with portions having said device held therebetween, arms extending from said portions sprung into interlocking engagement with opposed edges of the aperture in said wall and fingers directed toward said aperture and hooked to said plate, and
   (e) said fingers being springable independently of said arms while the bracket supports said electrical device on the wall to unhook said cover plate from said bracket for removal from said wall.

References Cited in the file of this patent
UNITED STATES PATENTS

| | | |
|---|---|---|
| 1,933,358 | Almcrantz | Oct. 31, 1933 |
| 2,914,288 | Beller | Nov. 24, 1959 |